United States Patent [19]

Bohning

[11] Patent Number: 5,335,885
[45] Date of Patent: Aug. 9, 1994

[54] AIRCRAFT WING HAVING A SUPER CRITICAL PROFILE AND A VENTING DEVICE FOR REDUCING COMPRESSION SHOCK

[75] Inventor: Rainer Bohning, Karlsruhe, Fed. Rep. of Germany

[73] Assignee: Deutsche Aerospace Airbus GmbH, Hamburg, Fed. Rep. of Germany

[21] Appl. No.: 27,862

[22] Filed: Mar. 8, 1993

[30] Foreign Application Priority Data

Mar. 6, 1992 [DE] Fed. Rep. of Germany ....... 4207103

[51] Int. Cl.$^5$ ............................................. B64C 21/08
[52] U.S. Cl. ................................. 244/204; 244/207; 244/208
[58] Field of Search ................. 244/204, 207, 208, 209

[56] References Cited

U.S. PATENT DOCUMENTS

| | | | |
|---|---|---|---|
| 1,913,644 | 6/1933 | Stalker | 244/208 |
| 3,915,412 | 10/1975 | Tibbs | 244/207 |
| 4,137,008 | 1/1979 | Grant et al. | 244/207 |
| 4,457,480 | 7/1984 | Englar | 244/207 |
| 4,522,360 | 6/1985 | Barnwell et al. | 244/204 |
| 4,660,788 | 4/1987 | Thiede | 244/209 |
| 4,957,249 | 9/1990 | Aulehla | |
| 5,167,387 | 12/1992 | Hartwich | 244/240 |

FOREIGN PATENT DOCUMENTS 3318413 11/1984 Fed. Rep. of Germany .
2187261 9/1987 United Kingdom ............... 244/208

OTHER PUBLICATIONS

"Boundary Layer Characteristics and Control in Jet Propelled Planes", Aero Digest, pp. 98–99, 170, Apr. 1, 1945.

*Primary Examiner*—Galen L. Barefoot
*Attorney, Agent, or Firm*—W. G. Fasse

[57] ABSTRACT

An aircraft wing having a super critical profile is equipped with a venting device extending in the direction of the span width along the upper side of the wing. The ventilating device includes a compensation chamber in the wing and the chamber is covered with a perforated wall strip on both sides of the compression shock. The forward end of the compensation chamber has a gap shaped exit for blowing out the venting medium in the flow direction of the flow across the wing tangentially to the wing.

11 Claims, 7 Drawing Sheets

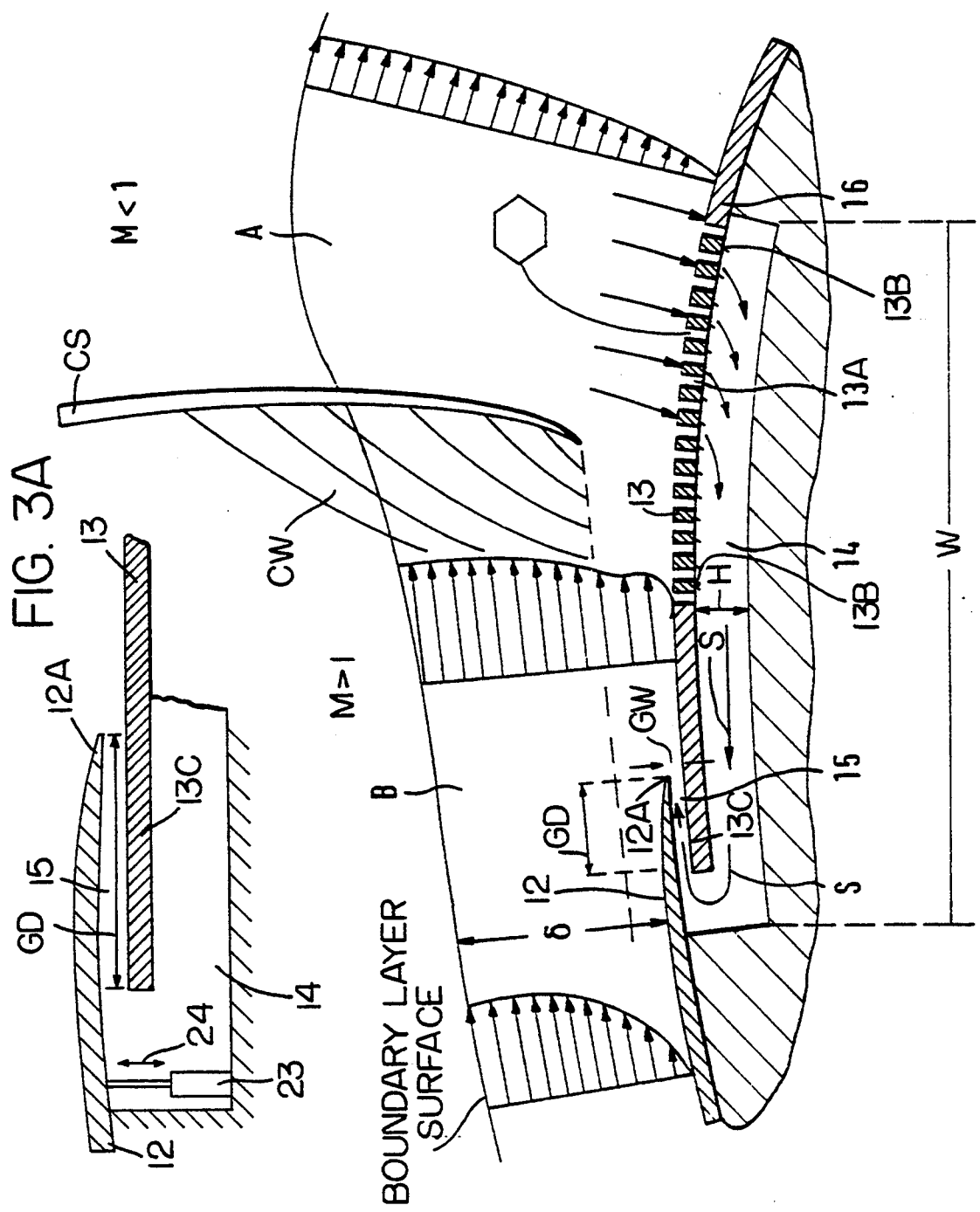

$\alpha = 1,68°$
$c_W = 0,0143$
$c_{WW} = 0,00263$
$c_V = 0,0116$

WITHOUT VENTING $\alpha = 1,0°$
$c_W = 0,0114$
$c_{WW} = 0,0038$
$c_V = 0,0076$

WITH VENTING $M = 0,75$ FREE STREAM MACH NUMBER
$Re = 6 \cdot 10^6$ REYNOLDS NUMBER
$c_a = 0,6$ LIFT COEFFICIENT Fig. 5a
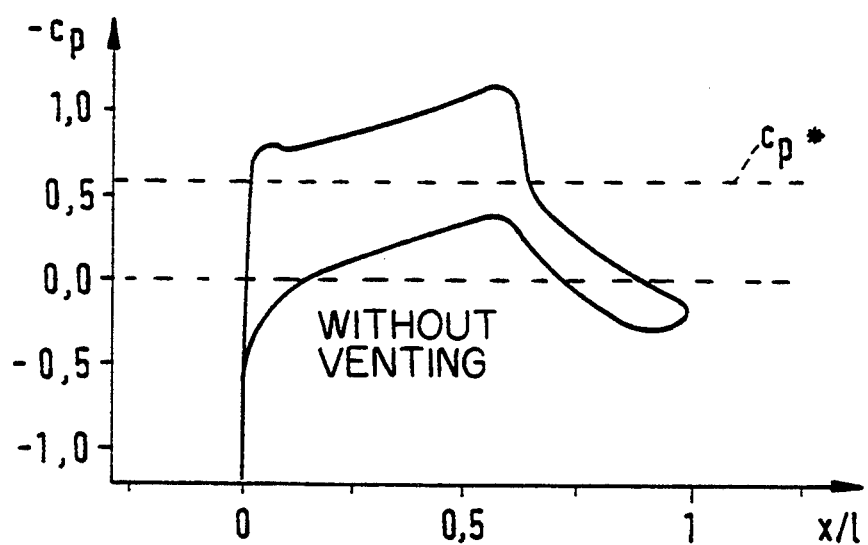
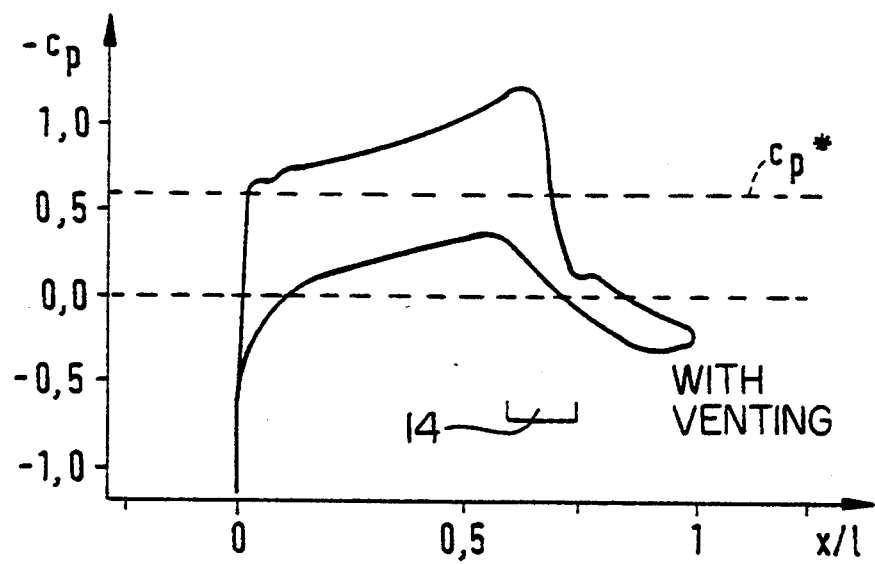
Fig. 5b

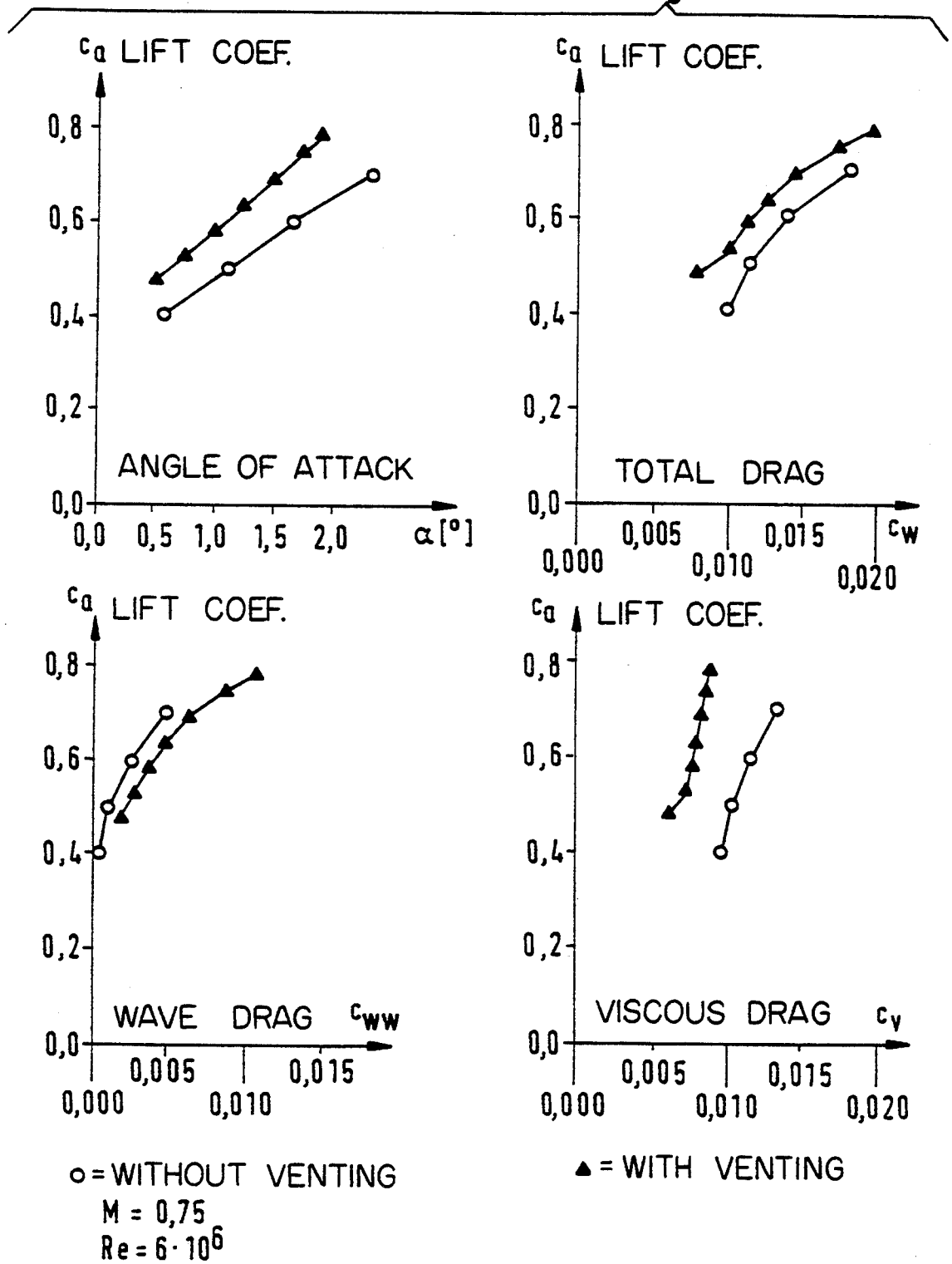

AIRCRAFT WING HAVING A SUPER CRITICAL PROFILE AND A VENTING DEVICE FOR REDUCING COMPRESSION SHOCK

FIELD OF THE INVENTION

The invention relates to an aircraft wing having a super critical profile with a venting device in the wing's upper side, whereby the venting device extends in the direction of the wing span width for influencing the boundary layer in the area where a compression shock occurs. The venting device includes a pressure equalization chamber covered by a perforated wall section, whereby the equalization chamber extends on both sides of the compression shock.

BACKGROUND INFORMATION

German Patent Publication 3,318,413 (Thiede), published on Nov. 22, 1984, discloses a wing of the type described above. As described in the German reference, wings of this type generate a local supersonic zone on the upper surface of the wing in the area where the wing has its maximum thickness when the wing is exposed to a transonic flow. For a certain wing design, it is possible to realize the transition from the supersonic flow to the subsonic flow almost free of shock, provided that the wing has a profile suitable for this purpose. However, even minor changes in the free stream conditions in the so-called "off-design" area normally cause the closing of the supersonic zone by a compression shock at the downstream end of the supersonic zone. Such a compression shock constitutes a substantial source for generating drag. Due to the interaction of the compression shock with the friction boundary layer close to the wing wall, and depending on the size or strength of the compression shock, it is possible that boundary layer separation occurs which in turn causes highly undesirable wing flutter or vibrations. It is possible to counteract these negative effects in a simple manner by passively influencing the area of interference between the compression shock and the boundary layer. This influencing method involves a self-regulating blowing out and sucking off of flow medium through a porous wall section of the wing in the area where the compression shock occurs. Said method uses a compensation chamber located below the area where the shock occurs. A pressure rise exceeding the compression shock induces a venting flow or stream through the porous wing surface, whereby a portion of the boundary layer behind the compression shock or rather downstream of the compression shock as viewed in the main flow direction across the wing is sucked off and blown out again upstream of the compression shock. If the compensation chamber is suitably positioned and dimensioned, the sucked off flow forms a feedback flow back into the main flow outside of the wing, whereby an advantageous influence is exerted onto the area of interference between the compression shock and the boundary layer. Such advantageous influence in turn improves the profile characteristics of the wing. The perforations in the upper wing wall into the compensation chamber may, as disclosed in German Patent Publication 3,318,413 (Thiede), be provided in the form of holes or bores extending either perpendicularly or slanted to the upper wing wall. The just described known method aims at reducing the wave drag while simultaneously keeping the viscous drag as small as possible.

OBJECTS OF THE INVENTION

In view of the above it is the aim of the invention to achieve the following objects singly or in combination:

to avoid boundary layer separations as much as possible by controlling the compression shock;

to control the compression shock by means of a passive ventilating device to thereby increase the lift drag ratio in the so-called "off-design" area; and to avoid adversely affecting the boundary layer upstream of the compression shock area, and without using any active blowers.

SUMMARY OF THE INVENTION

The above objects have been achieved according to the invention by providing a gap shaped flow exit along the upstream end of the compensation chamber for blowing out the ventiliation medium in the direction of the boundary layer flow, that is, substantially tangentially to the wing surface. Preferably, the just mentioned gap has such a gap depth in the flow direction that the tangential flow is enforced. However, the exit end of the gap remains located upstream of the compression shock. The formation of such an exit gap is realized by simple technical means, such as a cover section in the upper wing surface, whereby the cover section overlaps a portion of the wing surface sufficiently to obtain the required gap depth in the flow direction. Downstream, a section of a wing wall is provided with perforations below the compression shock. The perforations lead into the compensation chamber which provides a flow path between the perforations and the flow exit gap. The chamber and perforations including the gap extend in the direction of the wing span. This construction assures the generation of a compensating, self-regulating flow between the subsonic and the supersonic field, whereby a portion of the flow medium forming the boundary layer downstream of the compression shock is sucked off to be returned to the above mentioned gap upstream of the compression shock so as to be reintroduced into the onflowing boundary layer in a tangential manner. This feature has the advantage that the compression shock is actually displaced downstream of the chamber end and maintained in place at that location. The introduction of kinetic energy through the gap has a positive effect on the character of the boundary layer. The advantageous features of this arrangement are a marked reduction in the impulse loss thickness and in the boundary layer displacement thickness while simultaneously the wall shearing tension is increased. The velocity profile is substantially thickened, especially near the wall surface, whereby the tendency induced by the compression shock to cause boundary layer separation is counteracted. Further, the tangential blowing as taught by the invention, compared to the vertical or angular blowing, does not induce any additional impulse loss. Therefore, it is possible to permit a large mass or volume flow through the compensation chamber, whereby the venting effect is improved or amplified by the present teaching.

According to the invention, the construction of the venting device as taught herein results altogether in a reduction of the drag in the off-design area. Additionally, a substantial gain is obtained in the lift. The reduction of the total drag is based in this connection on the tangential blowing which causes a substantial reduction of the viscous drag. The gain of lift results from the displacement of the compression shock in the downstream direction.

Due to the reduction of the total drag combined with the simultaneous increase in the lift, the invention improves the aircraft capacity under "off-design" conditions and additionally, the off-design area itself is increased because the beginning of the wing flutter or vibrations is displaced toward higher lift values. Another advantage of the invention is seen in that the influencing of the compression shock as taught by the invention is achieved without any energy consuming features.

The present teaching is not only advantageous for transonic wings, but it may be employed basically in all situations where the compression shock interfers with the desirable flow of the boundary layers. Additionally, it is possible to close the gap and to also eliminate the feedback flow through the perforations with the help of a cover that temporarily closes the perforations, preferably on the inside of the perforated wall section.

BRIEF DESCRIPTION OF THE DRAWINGS

In order that the invention may be clearly understood, it will now be described, by way of example, with reference to the accompanying drawings, wherein:

FIG. 3 is a sectional view perpendicularly to the longitudinal wing axis to illustrate the construction of the present ventilating device while also showing the compression shock boundary layer interference area;

FIG. 3A shows, on an enlarged scale, a closeable gap construction;

FIG. 5A shows the calculated pressure characteristics along the boundary layer edge according to FIG. 4A;

FIG. 5B is a pressure characteristic for FIG. 4B;

FIG. 8 shows diagrams for the lift, the total drag, the wave drag, and the viscous drag.

DETAILED DESCRIPTION OF PREFERRED EXAMPLE EMBODIMENTS AND OF THE BEST MODE OF THE INVENTION

Figure 1:
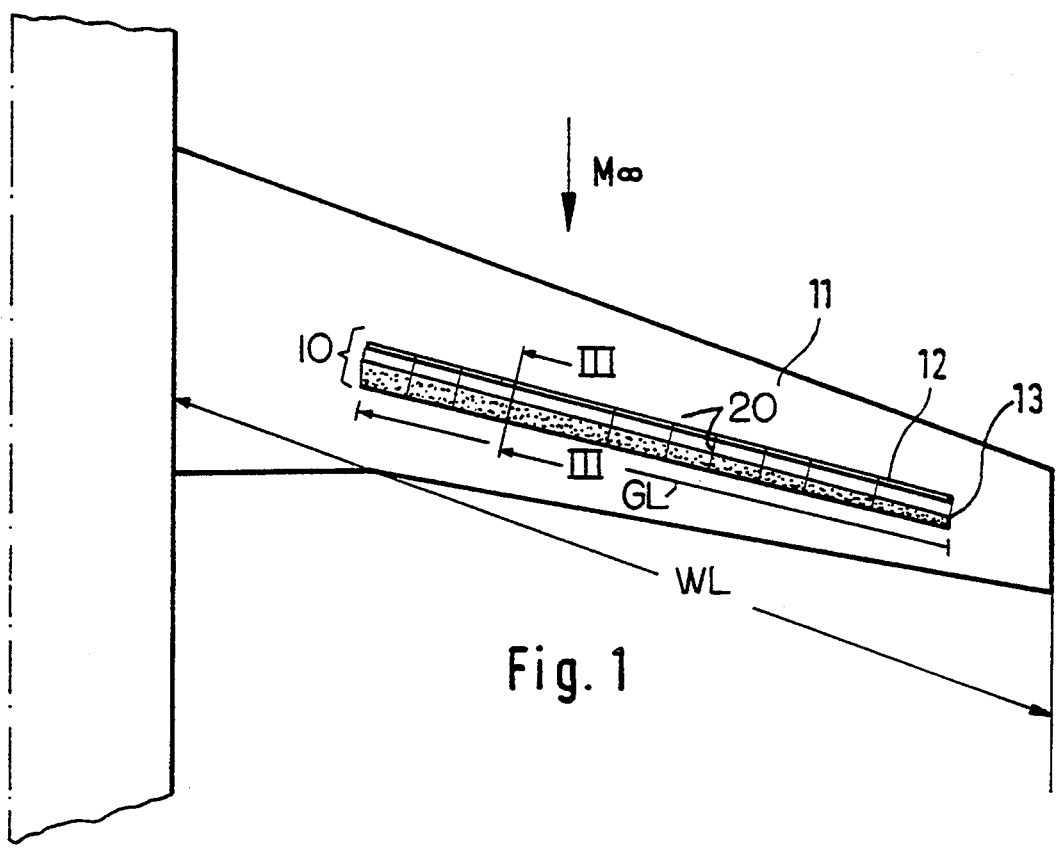
FIG. 1 is a schematic plan view of one wing of an aircraft constructed as a transonic wing.
Figure 2:
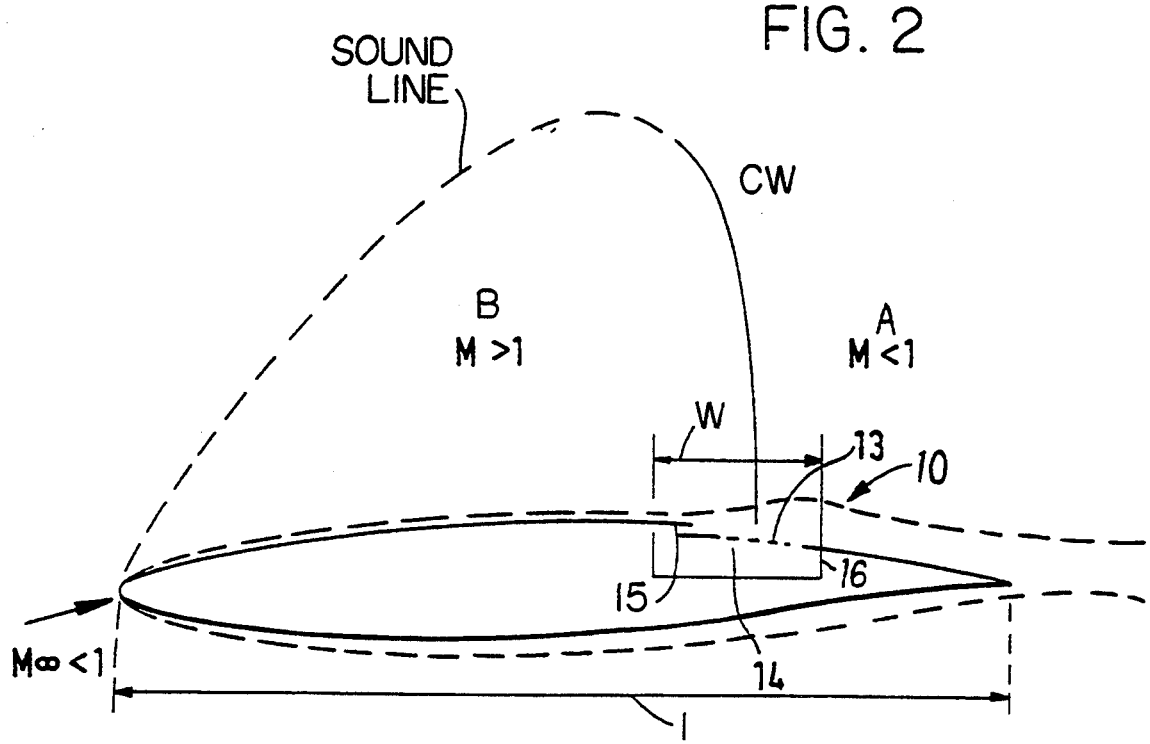
FIG. 2 is a schematic sectional view through the transonic wing of FIG. 1.

FIG. 1 shows schematically a plan view of a super critical wing 11 exposed to a super critical free stream indicated by an arrow $M\infty$. The wing has a length WL. According to the invention, the wing is equipped with a venting device 10 having a length GL that does not extend over the entire length of the wing length WL. The venting device 10 includes a perforated wall section 13, an outflow gap cover 12 for a tangential gap 15 and a feedback channel 14 not seen in FIG. 1, but shown in FIGS. 2 and 3. The gap cover 12 and the perforated wall section 13 are located relative to the chord length or wing depth "1" in such a position that a compression wave front CW or rather its compression shock CS is positioned approximately above the center of the perforated wall section 13 when no venting and thus no feedback takes place. FIGS. 2 and 3 show the position of the center of the perforated wall section 13 below the front of the compression wave CW or the respective compression shock CS without venting. In a modern wing 11 this position of wall section 13 is located approximately within a range of about 50% to about 70% of the chord length or wing depth "1".

In FIG. 2, the location of the compression wave front CW is approximately at 70% of the wing depth "1". If the just described positioning of the center of the perforated wall section 13 is optimally selected, the invention achieves a positive venting effect in the entire so-called "off-design" area.

Referring further to FIG. 1, the gap length GL which is also the length of the flow guide channel 14, is shorter than the wing length WL. Further, the chamber 14 is divided by separation walls 20 extending in the chord direction for avoiding a pressure equalization within the chamber 14 along its length.

FIG. 3 shows the perforations 13A in the perforated wall section 13, which may also have an unperforated portion 13C to form an exit gap 15 for the feedback flow S to be described in more detail below. The wall portion 13C may actually also be perforated. Flaps or slats 13B are hinged to the downward facing surface of the wall section 13 to close the perforations 13A if desired. The total cross-sectional through flow area of the perforations 13A relative to the total surface area of the wall section 13 is preferably within the range of about 4% to about 20%. Preferably, the individual perforations 13A have a hexagonal cross-sectional configuration as shown in FIG. 3.

FIG. 2 shows the wing depth or chord length "1" and the position of the venting device 10 relative to the wing depth "1". The chamber 14 has a chamber width W in the flow direction. The chamber 14 bridges a local supersonic zone B and a subsonic zone A. The chamber height H shown in FIG. 3 is not critical because the mass flow or volume of the feedback flow through the chamber 14 is relatively small. Both, in FIGS. 2 and 3, the chamber height H is not shown to scale. In practice, the chamber height H may correspond to approximately twice the boundary layer thickness $\delta$ shown in FIG. 3. The chamber width W in the flow direction, which in a rough approximation corresponds to the spacing between the gap 15 and the chamber end 16, corresponds in practice to about 5% to 20% of the wing depth "1".

FIG. 3 shows the chamber 14 and its width W in the flow direction as well as the formation of the gap 15 between the gap cover 12 and the extension portion 13C of the wall section 13. The flow exit gap 15 has a gap width GW and a gap depth GD, as well as the gap length GL which should not exceed approximately 80% of the wing length WL. The gap depth GD is measured between the edge 12A of the gap cover 12, and the left edge of the wall portion 13C in FIG. 3. This gap depth GD is within the range of about three to ten times of the width of the gap to assure the tangential discharge of the feedback flow through the gap width GW. The gap width is determined so that the cross-sectional flow area corresponds approximately to the cross-sectional through flow area of the perforation 13A. The wall section 13 is perforated either partially or entirely along its length. In both instances, the right-hand portion of the wall section 13 will be perforated. As mentioned, the cross-sectional flow area of the perforations 13A is preferably hexagonal as shown in FIG. 3. The unperforated wall portion 13C of the wall section 13 will normally have a length in the flow direction corresponding to one or several boundary layer thicknesses $\delta$. However, it is also possible to extend the perforations all the way into the gap 15. The flowing medium S passes through the perforations 13A extending perpendicularly to the surface of the wall sections 13 as indicated by the arrows, due to the higher pressure in the area A than in the area B, and flows through the chamber 14 to the gap 15 which directs the flow S tangentially onto the wing upper surface. Depending on the extension of the perforations 13A into the portion 13C, some of the flow medium may escape even between the compression shock CS and the gap 15. In this instance, the tangentially exiting flow through the gap and vertically exiting flow through some of the perforations 13A results in a mixing of the flow medium upstream of CS, whereby the invention constitutes a combination of the present features with those disclosed in German Patent Publication 3,318,143.

The tip or rather exit edge 12A of the gap cover 12 is so constructed and contoured that the boundary layer is not adversely influenced by induced separation vortices.

FIG. 3A shows, on a somewhat enlarged scale, a modification of the gap 15. The modification is a flexible or hinged cover 12. The cover 12 is operable by a piston cylinder device 23 or any other suitable drive to move the cover 12 between an open position as shown or a closed position in which the right-hand edge of the cover 12 rests on the wall portion 13C to close the gap 15 if desired. The piston cylinder device 23 has a piston rod movable up and down as indicated by the arrow 24 for opening or closing the exit gap 15.

FIGS. 4 to 8 illustrate the results of a numeric simulation of a supersonic wing profile of the standardized type LVA-1A. FIGS. 4A, 5A, 6A and 7A show the situation without the venting device 10 according to the invention. FIGS. 4B, 5B, 6B, and 7B show the improvements achieved by the venting device 10 according to the invention. In all instances the Mach number M∞ is equal to 0.75 and the Reynolds number Re is $6 \times 10^6$. The lift coefficient $C_a$ corresponds in each instance to 0.6 in FIGS. 4 to 7.

Figure 4A:
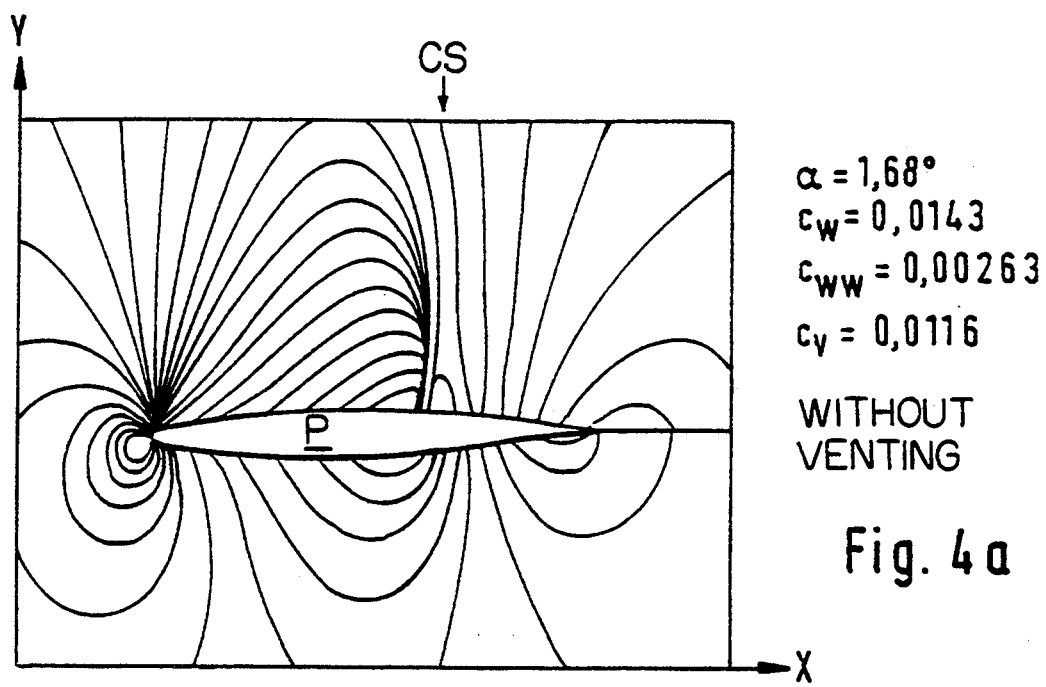
FIG. 4A shows a field of isotachs for a wing without venting and without displacement of the compression shock.
Figure 4B:
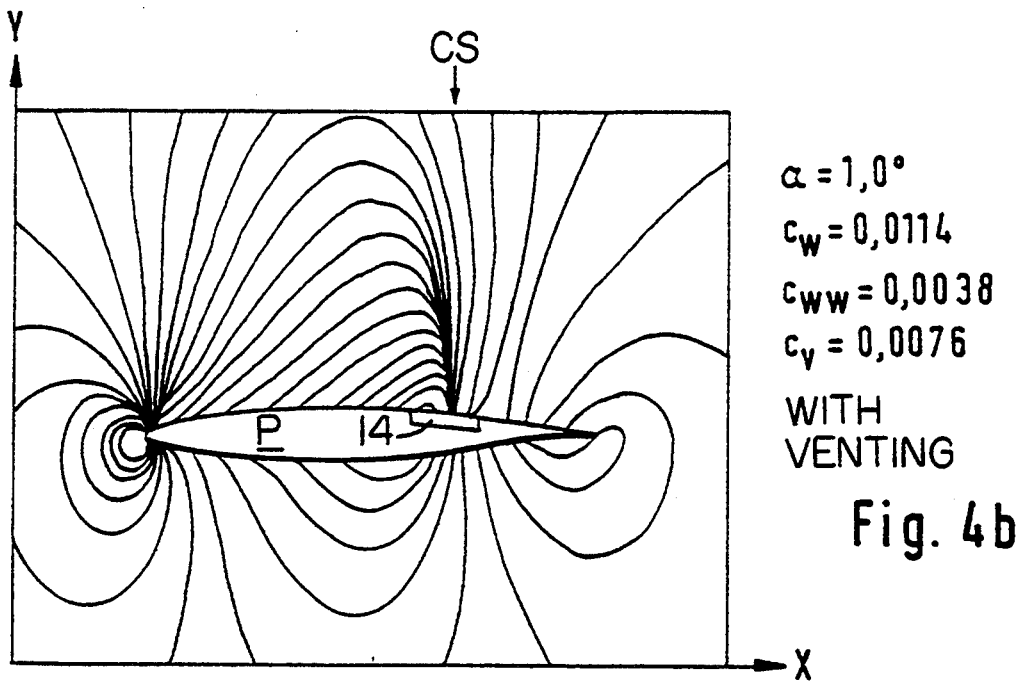
FIG. 4B is a field of isotachs for a wing with ventilation, whereby the feedback flow is blown out tangentially and a portion of the boundary layer is sucked in perpendicularly to the wall or flow direction.

In FIG. 4 the Greek letter $\alpha$ represents the angle of attack which is 1.68° in FIG. 4A and 1° in FIG. 4B. The abbreviation $c_W$ is the total drag coefficient. The abbreviation $c_{WW}$ is the wave drag. The abbreviation $c_V$ is the viscous drag.

FIGS. 4A and 4B illustrate the isotach fields of the respective wall compression characteristics. Comparing FIG. 4B with FIG. 4B shows that the compression shock CS has been displaced toward the end of the chamber 14 in the standardized wing profile P. The angle of attack $\alpha$ has been reduced from 1.68° to 1° while the lift remains the same. This permits the conclusion that when keeping the angle of attack $\alpha$ constant, a substantial lift gain is achieved according to the invention with the venting as compared to the situation without venting.

FIGS. 5A and 5B respectively illustrate the negative compression above the wing as a function of the ratio x/1, wherein x is the point on the surface of the wing, and "l" is the wing depth. Incidentally, this ratio along the abscissa also applies to FIGS. 6A, 6B, 7A, and 7B.

Figure 6A:
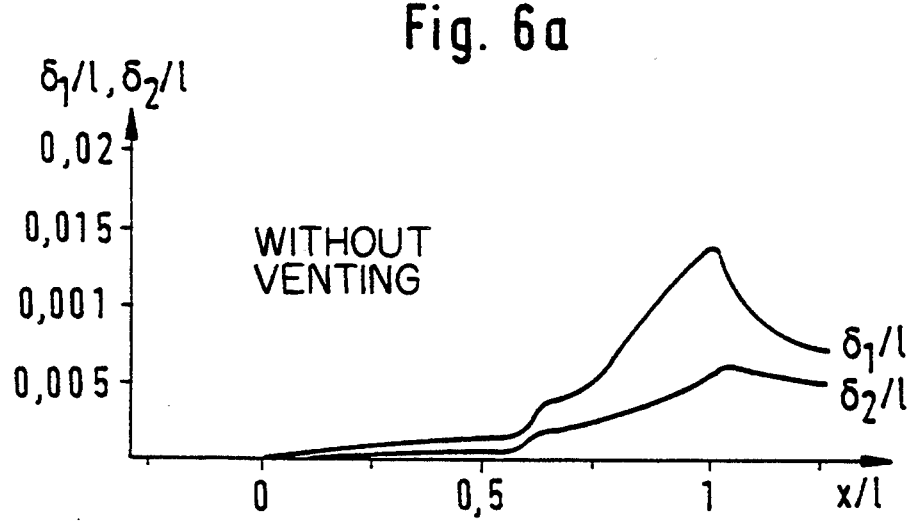
FIG. 6A illustrates calculated displacement thicknesses and impulse loss thicknesses according to FIG. 4A.
Figure 6B:
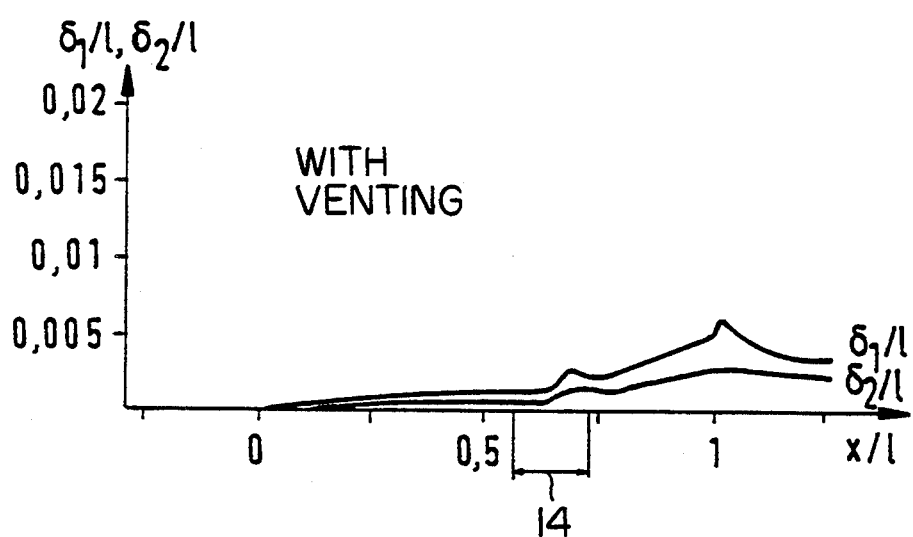
FIG. 6B illustrates calculated displacement thicknesses and impulse loss thicknesses according to FIG. 4B.

Referring to FIGS. 6A and 6B, the ordinate in both instances represents the boundary layer displacement thickness $\delta1/1$ and the impulse loss thickness $\delta2/1$. Comparing FIG. 6A with FIG. 6B, it is apparent that both boundary layer values are drastically reduced in the case where the venting according to the invention is applied. The reduction of the impulse loss thickness in turn causes a smaller viscous drag which is another advantage of the invention.

Figure 7A:
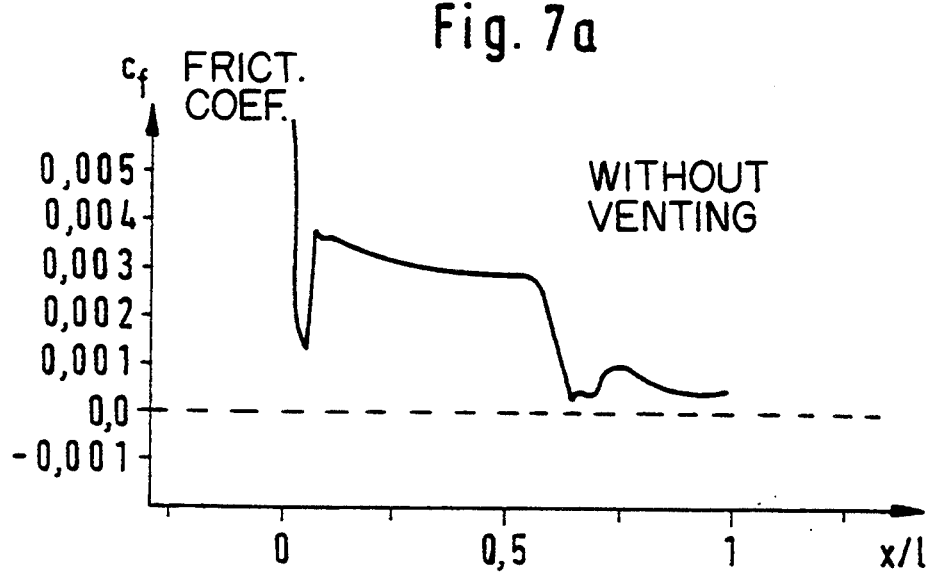
FIG. 7A illustrates calculated friction coefficients for FIG. 4A.
Figure 7B:
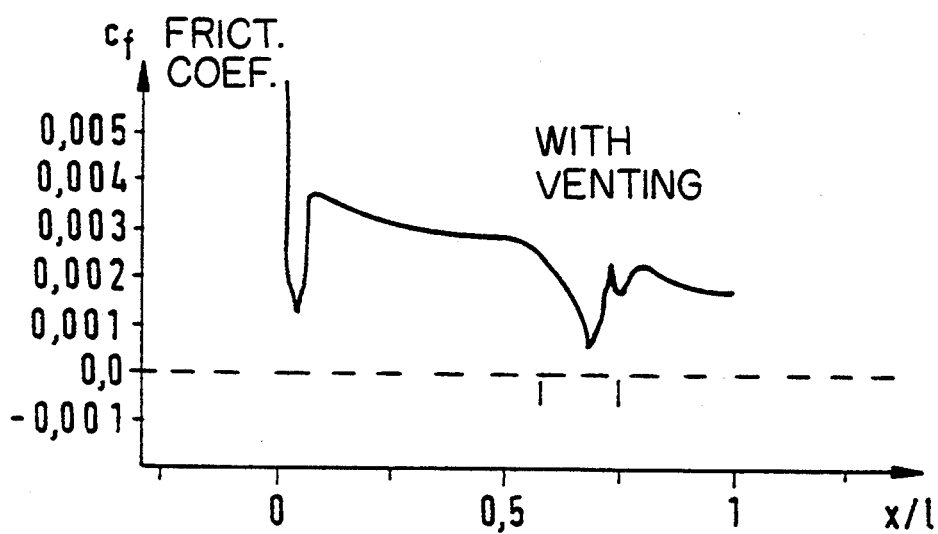
FIG. 7B illustrates calculated friction coefficients for FIG. 4B.

FIGS. 7A and 7B illustrate the characteristic of the friction coefficient $c_f$. This characteristic indicates that according to the invention there is a substantially smaller tendency of the boundary layer to separate as compared to the case without venting. Incidentally, the friction coefficient shown relates to the wing upper surface.

FIG. 8 illustrates the improvement in the lift coefficient $c_a$ achieved according to the invention. The curves along the small circles represent the situation without venting. The curves along the little triangles represent the venting according to the invention. The Mach number is in both instances 0.75. The Reynolds number is in both instances $6 \times 10^6$. The blowing takes place tangentially out of the gap 15 and the suction into the chamber 14 takes place vertically to the upper surface of the wing. The perforation of the wall section 13 is 6%. The chamber 14 begins at x/1=0.59 and it ends at x/1=0.74. It can be seen from FIG. 8 that the invention achieves an overall improvement in the lift, in the total drag, and very significantly in the viscous drag. The wave drag increases somewhat. However, this is well compensated by the fact that the total drag is reduced, due to the substantial reduction in the viscous drag.

Although the invention has been described with reference to specific example embodiments, it will be appreciated that it is intended to cover all modifications and equivalents within the scope of the appended claims.

What I claim is:

1. An aircraft wing, comprising venting means in an upper surface of said aircraft wing, said venting means extending in the direction of a wing span width for influencing a boundary layer in a zone where a compression shock takes place, said venting means comprising a perforated wall section and a compensation flow chamber extending upstream and downstream on both sides of said compression shock as viewed in a flow direction across the wing, said perforated wall section covering at least a portion of said compensation chamber, said perforated wall section having perforations therein for admitting flow into said compensation chamber downstream and below said compression shock, said compensation chamber comprising a flow exit gap for blowing vented flow medium in a direction of a main flow across said upper wing surface, said flow exit gap being positioned along a forward end of said compensation chamber upstream of said compression shock, and wherein said flow exit gap has a gap depth (GD) in the main flow direction sufficient to enforce a tangential flow of said vented flow medium substantially in parallel to said upper wing surface and substantially in parallel to said boundary layer.

2. The aircraft wing of claim 1 having a super critical profile.

3. The aircraft wing of claim 1, wherein said flow exit gap (15) is spaced from a downstream end (16) of said perforated wall section (13) by a spacing that is dimensioned to a value within the range of 5% to 20% of the wing depth ("1") at that point, and wherein the center of said spacing is arranged in an area corresponding to 50% to 70% of the local wing depth (shock location) of the upper wing side.

4. The aircraft wing of claim 3, wherein said spacing corresponds to a width (W) of said compensation chamber in said flow direction.

5. The aircraft wing of claim 1, wherein said venting means (10) comprising said flow exit gap (15), said perforated wall section (13), and said compensation chamber (14) extends only over a portion of the wing span width, said gap (15), wall section (13), and chamber (14) having the same length (GL).

6. The aircraft wing of claim 1, wherein said compensation chamber (14) and its flow exit gap forming said venting device (10), are divided by separation walls (20) extending crosswise to the direction of the wing span width.

7. The aircraft wing of claim 1, further comprising a gap cover (12) forming said flow exit gap, and means for varying a gap width (GW) of said flow exit gap (15).

8. The aircraft wing of claim 1, further comprising means (13B) for varying and/or closing the cross-sectional flow area of said perforated wall section (13), said means for varying and/or closing being arranged on an inner side of said perforated wall section.

9. The aircraft wing of claim 1, wherein said venting means with its flow exit gap and said perforated wall section are positioned in locations where compression shocks (CS) interfere with a boundary layer on the surface of the wing.

10. An aircraft wing, comprising venting means in an upper surface of said aircraft wing, said venting means extending in the direction of a wing span width for influencing a boundary layer in a zone where a compression shock takes place, said venting means comprising a perforated wall section and a compensation flow chamber extending upstream and downstream on both sides of said compression shock as viewed in a flow direction across the wing, said perforated wall section covering at least a portion of said compensation chamber, said perforated wall section having perforations therein for admitting flow into said compensation chamber downstream and below said compression shock, said compensation chamber comprising a flow exit gap for blowing vented flow medium in a direction of a main flow across said upper wing surface, said flow exit gap being positioned along a forward end of said compensation chamber upstream of said compression shock, and further comprising a gap cover (12) forming said flow exit gap upstream of said compression shock (CS), and means (23) connected to said gap cover (12) for varying a gap width (GW) of said flow exit gap (15) to enforce a tangential flow of said vented flow medium.

11. The aircraft wing of claim 10 having a super critical profile.

* * * * *